United States Patent Office 2,881,512
Patented Apr. 14, 1959

2,881,512

COMPOSITION FOR SINTERED BARIUM CATHODES

Harry Huber, Jean Freytag, and Jean Reynaud, Paris, France, assignors to Compagnie Generale de Telegraphite Sans Fil, a corporation of France No Drawing. Application June 13, 1955
Serial No. 515,171

Claims priority, application France June 16, 1954

13 Claims. (Cl. 29—182.5)

The invention relates to tablets constituting the emissive part of sintered barium cathodes. These tablets are generally obtained by agglomerating, for instance by compressing and sintering a mass of powdered materials containing the cation Ba and various metals.

It is an object of the invention to provide a composition for sintered barium cathodes of the type comprising: a barium composition, a reducer and a "carrier."

In the composition of the invention, the barium composition has the general formula $nX+M_xO_y$, X designating either BaO alone or a combination of BaO with CaO or SrO, or CaO+SrO, M designating a metal having a valence at least equal to 4; $n$, $x$, and $y$ being the atomic or molecular proportions of the constituents. This barium composition will be hereinafter called "stabilized barium oxide." The above general formula may indicate either a solid solution, a chemical compound, or any other combination of the oxides. In the preferred composition of the present invention, the barium composition has the general formula $3BaO+WO_3$, i.e., basic barium tungstate. This barium composition will be called hereinafter "stabilized barium oxide."

The reducer of the composition according to the invention is a metal capable of reducing said barium composition when the two bodies are in the solid state, and the "carrier" is a refractory metal. The same metal may also be used as reducer and as carrier.

According to a preferred embodiment of the invention, the molecular proportion of the carrier is 50 to 97% of the composition.

According to another embodiment of the invention, said barium composition further includes strontium oxide.

According to still another embodiment of the invention, said barium composition further includes strontium oxide and calcium oxide.

Another object of the invention is to provide a process of manufacture of tablets for sintered barium cathodes. This process comprises the following steps: intimately mixing a carbonate containing at least the cation Ba and a stabilizing metal oxide, at a temperature between 430° C. and 1,230° C.; powdering the barium composition thus obtained and designated stabilized barium oxide, mixing the stabilized barium oxide with a reducer and a carrier, both of which having been finely powdered; subjecting this mixture to a high pressure and sintering the same at high temperature. The surface of the sintered tablet is then preferably ground.

According to a preferred mode of carrying out the invention, said barium composition is basic barium tungstate ($3BaO+WO_3$), the reducer is aluminum, the sintering is effected in a neutral atmosphere at a temperature between 1315° C. and 1800° C., and its duration is between 3 hours and 5 minutes.

The invention will be more clearly understood from the following examples to which the scope of the invention is not intended to be limited.

Example 1

There is first obtained an intimate mixture of barium carbonate $BaCO_3$ and tungsten oxide $WO_3$ which is powdered for several hours in the proportions of 3 molecules of $BaCO_3$ to 1 molecule of $WO_3$. This mixture is heated in a crucible in a furnace having a neutral atmosphere, such as argon, for half an hour to one hour at a temperature between 430° C. and 1230° C. After baking, the mixture is powdered, for instance, by a ball mill, for a period ranging from several hours to 30 hours. According to the duration of grinding, the resultant size of the grains varies from 30 to 1 micron. Double oxide ($3BaO+WO_3$), obtained by means of the aforementioned operations, is mixed and powdered with aluminum and tungsten for several hours, in the proportions of 5 molecules of $Ba_3WO_6$ to 15 atoms Al and 80 atoms of W, the size of the grains of aluminum and tungsten being between 1 and 50 microns. A certain amount of this mixture is compressed by means of a press capable of providing a pressure between 1 and 30 metric tons/cm.² The tablet obtained is positioned on its support, or in a container permitting its attachment to the support, and is sintered in an argon atmosphere at a temperature between 1315° C. and 1800° C. for a period ranging from 3 hours to 5 minutes. The surface of the sintered tablet is then ground.

The tablet thus obtained possesses the following advantages:

(1) High mechanical resistance to tearing, rupture or shearing.

(2) Low susceptibility to ionic bombardment and poisoning by gases and vapors.

(3) Possibility of supplying current at high density under conditions of both continuous and pulse operation.

(4) Smooth surface and good geometric definition of the emissive zone.

(5) High thermal efficiency.

(6) Solidity and strength when subjected to mechanical stresses and heat changes.

(7) Long life without metallization of the electrodes disposed in front of the cathode.

(8) Minimum emission of gas during degassing and activation.

(9) Ease of machining.

(10) Easier adjustment of the liberation rate of barium and of the formation by diffusion of the barium film to suit operation of conditioner of the cathode.

Cathodes utilizing this tablet are capable of operating between 830° C. and 1,250° C., and of supplying several amperes per sq. cm. under conditions of continuous operation and several tens of amperes per sq. cm. under conditions of pulse operation.

Some of the above-indicated advantages may be attributed to the formation of a film of active barium adsorbed at the surface of the carrier (tungsten). This film of barium decreases the work function of the tungsten. As this film is continuously subjected to destructive effects in the course of the operation of the cathode, it must be continuously renewed. This renewal is obtained by reason of the fact that the aluminum reducer liberates barium from the supplier of barium, i.e. ($3BaO+WO_3$); said barium diffuses towards the surface of the carrier at the high temperature of operation of the cathode. The rate of liberation of the barium atoms depends, in particular, on the proportions and on the nature of the supplier. It has been found that, with the composition of barium used according to the invention, the rate of diffusion may be correctly adjusted to obtain the desired density of emitted current.

The function of the stabilizing oxide $WO_3$ is to stabilize chemically the oxide BaO, which should be deteriorated in the presence of atmospheric air before sintering of the tablet.

*Example 2*

The same process of manufacture as in Example 1 is used with the following composition:

5(3BaO+WO$_3$)+15Al+80Mo

*Example 3*

The same process of manufacture as in the foregoing examples is used with the following composition:

20(3BaO+WO$_3$)+80W

The tungsten performs the function of reducer, carrier and stabilizing oxide cation.

As all the bodies included in the formula mentioned above are very refractory, there is no danger of formation of vapors which are harmful to the cathode or to the other electrodes of the tube in which the cathode is placed.

*Example 4*

The composition used is:

20(3BaO+WO$_3$)+10W+70Mo the reducer being tungsten and the carrier being molybdenum.

It must be understood that the scope of the invention is not intended to be limited to the specific examples given above.

It is contemplated within the scope of this invention that the cathode composition may be made by mixing with a refractory metal carrier and a metal capable of reducing barium tungstate a powder, such as 3BaO+WO$_3$·(SrO)$_3$WO$_3$ or 3BaO+WO$_3$·(SrO)$_3$WO$_3$·(CaO)$_3$WO$_3$ and then compressing and sintering the mixture.

In a general way, an oxide of one of the following metals may be used as a stabilizer: W, Th, Ta, Nb, Mo, Ti, Zr. More generally it has been found that there may be used any metal having a valence at least equal to 4.

Stabilized barium oxide may be obtained either from barium carbonate, as in the first example described above, or from double carbonates such as BaCO$_3$—SrCO$_3$, or triple carbonates such as BaCO$_3$—SrCO$_3$—CaCO$_3$. In certain cases, the presence of another carbonate, in addition to barium carbonate, facilitates the stabilization of BaO or the formation of solid solutions permitting the stabilized compound to be enriched with BaO.

Similarly, the reducer may be selected from the group consisting of metals such as Ti, Zr, Th, Ta, Nb, W, Mo, Al, Si, which are capable of reducing BaO at high temperatures, by a reaction in the solid state, BaO and this reducer being in the form of sintered powders.

The carrier is a refractory metal such as W, Mo, Re, Nb.

It has been seen in some of the foregoing examples that a single metal may perform several of the respective functions of stabilizer, reducer and carrier. It is obvious that it must then possess all the properties required for the various functions it performs simultaneously. For example, W in the Example 3 is capable of reducing BaO in the solid state and is sufficiently refractory for performing the function of carrier.

What is claimed is:

1. Composition for a tablet used as emissive portion of a sintered barium cathode consisting essentially of

| | Percent |
|---|---|
| 3BaO+WO$_3$ (basic barium tungstate) | 5 |
| Al | 15 |
| W | 80 |

2. Composition for a tablet used as emissive portion of a sintered barium cathode consisting essentially of

| | Percent |
|---|---|
| 3BaO+WO$_3$ (basic barium tungstate) | 5 |
| Al | 15 |
| Mo | 80 |

3. Composition for a tablet used as emissive portion of a sintered barium cathode, consisting essentially of

| | Percent |
|---|---|
| 3BaO+WO$_3$ (basic barium tungstate) | 20 |
| W | 80 |

4. An emissive cathode composition for a tablet used as emissive portion of a sintered barium cathode, consisting essentially of between 50 to 97 percent of refractory metal carrier, and of a balance comprising at least a chemically bound barium composition having general formula $n$BaO+M$_x$O$_y$ wherein M is a metal having a valence at least equal to 4, and $n$, $x$, $y$ are integers indicating molecular or atomic proportions of the constituents of such chemically bound compositions satisfying said general formula, said cathode composition containing a proportion of a metal reducer capable of reducing the barium composition at the temperature of operation of said cathode.

5. An emissive cathode composition as claimed in claim 4, wherein M is a metal selected from the group consisting of W, Th, Ta, Nb, Mo, Ti, Zr.

6. An emissive cathode composition as claimed in claim 4, wherein said balance comprises said proportion of reducer of said barium composition, said reducer being selected from the group consisting of Ti, Zr, Th, Ta, Nb, W, Mo, Al, Si, the selection of carrier and reducer being so made that the same element is not used as said reducer and said refractory carrier.

7. An emissive cathode composition as claimed in claim 4, wherein said refractory carrier metal is selected from the group consisting of W, Mo, Re, Nb.

8. An emissive cathode composition as claimed in claim 4, wherein said barium composition is basic barium tungstate 3BaO+WO$_3$.

9. An emissive cathode composition as claimed in claim 8, wherein said balance comprises Al as said proportion of reducer of said barium tungstate.

10. An emissive cathode composition as claimed in claim 8, wherein said balance further includes basic strontium tungstate.

11. An emissive cathode composition as claimed in claim 10, wherein said balance further includes basic calcium tungstate.

12. An emissive cathode composition for a tablet used as emissive portion of a sintered barium cathode, consisting essentially of between 50 to 97 percent of refractory metal carrier, and of a balance comprising at least a chemically bound barium composition having general formula $n$X+M$_x$O$_y$ wherein X includes barium oxide and strontium oxide, M is a metal having a valence at least equal to 4, and $n$, $x$, $y$ are integers indicating molecular or atomic proportions of the constituents of such chemically bound compositions satisfying said general formula, said cathode composition containing a proportion of a metal reducer capable of reducing the barium composition at the temperature of operation of said cathode.

13. An emissive cathode composition according to claim 12, wherein X further includes calcium oxide.

References Cited in the file of this patent

UNITED STATES PATENTS

| 1,363,162 | Myers et al. | Dec. 21, 1920 |
| 2,488,731 | Lambert | Nov. 22, 1949 |
| 2,700,118 | Hughes et al. | Jan. 18, 1955 |